United States Patent [19]

Srail et al.

[11] Patent Number: 5,286,576
[45] Date of Patent: Feb. 15, 1994

[54] COMPRESSION MOLDED FLAME RETARDANT AND HIGH IMPACT STRENGTH ULTRA HIGH MOLECULAR WEIGHT POLYETHYLENE COMPOSITION

[75] Inventors: Raymond C. Srail, Parma; Richard A. Glover, Brookpark; Roy L. Orndorff, Jr., Kent, all of Ohio

[73] Assignee: The B.F. Goodrich Company, Akron, Ohio

[21] Appl. No.: 759,988

[22] Filed: Sep. 12, 1991

Related U.S. Application Data

[63] Continuation of Ser. No. 396,251, Aug. 21, 1989, abandoned.

[51] Int. Cl.⁵ .................. B32B 27/32; C08K 3/32
[52] U.S. Cl. .................. 428/517; 428/290; 428/921; 428/325; 428/516; 524/416
[58] Field of Search .............. 428/295, 375, 920, 379, 428/921, 390, 290, 295, 375, 920, 921, 379, 390, 290; 524/416

[56] References Cited

U.S. PATENT DOCUMENTS

| | | | |
|---|---|---|---|
| 4,145,330 | 3/1979 | Zorzi et al. | 524/125 |
| 4,165,309 | 8/1979 | Fielding et al. | 524/112 |
| 4,185,008 | 1/1980 | Caspari et al. | 524/288 |
| 4,246,374 | 1/1981 | Kopchik | 525/379 |
| 4,298,509 | 11/1981 | Fochesato | 524/371 |
| 4,333,869 | 6/1982 | Marciandi et al. | 524/140 |
| 4,509,559 | 4/1985 | Cheetham et al. | 428/921 |
| 4,518,552 | 5/1985 | Matsuo et al. | 264/126 |
| 4,579,894 | 4/1986 | Bertelli et al. | 524/94 |
| 4,597,818 | 7/1986 | Aoyama et al. | 156/308.2 |
| 4,670,508 | 6/1987 | Ohdaira et al. | 525/154 |
| 4,727,102 | 2/1988 | Scarso | 524/100 |
| 4,731,199 | 3/1988 | Matsuo et al. | 428/36 |
| 4,758,627 | 7/1988 | Wilkus et al. | 525/240 |
| 4,781,979 | 11/1988 | Wilkus et al. | 428/390 |
| 4,816,517 | 3/1989 | Wilkus et al. | 525/240 |
| 4,853,427 | 8/1989 | Herten et al. | 524/394 |
| 4,864,001 | 9/1989 | Wilkus et al. | 525/240 |
| 4,913,962 | 4/1990 | Wilkus et al. | 428/379 |
| 4,933,393 | 6/1990 | Toyota et al. | 525/240 |
| 4,935,262 | 6/1990 | Wilkus et al. | 428/379 |
| 4,945,132 | 7/1990 | Wilkus et al. | 525/194 |
| 4,973,626 | 11/1990 | Wilkus et al. | 525/104 |

FOREIGN PATENT DOCUMENTS

| | | |
|---|---|---|
| 0326082 | 8/1989 | European Pat. Off. . |
| 0086946 | 7/1981 | Japan . |
| 60-240748 | 11/1985 | Japan . |
| 0220555 | 9/1987 | Japan . |
| 63-72742 | 4/1988 | Japan . |
| 0193347 | 8/1989 | Japan . |

OTHER PUBLICATIONS

Braun et al, "Ultra high molecular polyethylene-the material and its modifications", German Plastics, vol. 69, Aug. 8, 1979, pp. 4-5. English translation of JP 62-220555, pp. 1-9, Yokosuka et al.

*Primary Examiner*—George F. Lesmes
*Assistant Examiner*—Chris Raimund
*Attorney, Agent, or Firm*—Joseph Januszkiewicz; Daniel J. Hudak

[57] ABSTRACT

Impact resistant and flame retardant polymer composition, slab-like rectangular solid made of said composition, and composite laminate article having at least one layer of said composition. The polymer composition comprises a maximum of 86 volume percent of ultra high molecular weight polyethylene (UHMWPE), a minimum of 4.40 volume percent of a flame retardant additive or mixture thereof, and a minimum of 6 volume percent of chopped reinforcing fibers, all volumes referring to the densified (molded) state. In addition the bulk volume of the chopped reinforcing fibers, as measured by a tapped density test, must be a minimum of 27 percent of the final molded volume of the composition. The maximum volume % loading of the additives is limited by the requirement that the notched Izod impact strength is a minimum of 7 ft.-lb per inch width. The preferred flame retardant additive is essentially a water insoluble form of ammonium polyphosphate having a water solubility not exceeding 1 gram per 100 grams of water, and the preferred reinforcing fibers are chopped glass fibers about ⅛ to ¼" inch in length.

19 Claims, 1 Drawing Sheet

COMPRESSION MOLDED FLAME RETARDANT AND HIGH IMPACT STRENGTH ULTRA HIGH MOLECULAR WEIGHT POLYETHYLENE COMPOSITION

This application is a continuation of application Ser. No. 07/396,251 filed on Aug. 21, 1989, by Raymond Charles Srail et al, for COMPRESSION MOLDED FLAME RETARDANT AND HIGH IMPACT STRENGTH ULTRA HIGH MOLECULAR WEIGHT POLYETHYLENE COMPOSITION, abandoned.

TECHNICAL FIELD

This invention relates to polymeric compositions which are both impact resistant and fire retardant, and whose combustion products are essentially non-toxic, and two composite laminates in which at least one of the layers is formed of such composition.

Ultra-high molecular weight polyethylene (UHMWPE) is known for its high impact strength. In fact, "Modern Plastics Encyclopedia" 1984–85, McGraw Hill Publications Company, Page 68, states that UHMWPE has the highest impact toughness of any plastic, even at cryogenic temperatures. Because of its high impact strength, UHMWPE has been used in structures where such high impact strength is required. One illustration is an impact fender for protecting the hull of a ship, as shown and described in U.S. Pat. No. 4,679,517 to Kramer. A problem with UHMWPE is that it is highly flammable. Thus, while structures prepared from UHMWPE may offer high impact resistance, their rapid flame spread, high heat evolution and flame drip tendencies while burning, pose significant dangers in fire situations.

Compounded polymeric materials having good flame retardancy are also known. Many of these are based on polyvinyl chloride (PVC) or other halogenated polymers. Others are based on non-halogenated polymer containing a halogenated additive. The problem with compositions containing halogen, whether in the polymer itself or in an additive, is that the combustion products of such compositions are toxic.

Other non-halogenated additives which impart fire retardancy to polymeric compositions are known. Often a combination of two or more additives, rather than a single additive, is used to achieve fire retardancy.

A drawback with most single package fire retardant additives is that they have an extremely detrimental effect on impact strength. This is acceptable in many situations, where the fire retardant composition (typically in the form of a sheet or slab or the like) is not subject to high impact stress. In certain situations, in which both high impact strength and fire retardancy are essential or at least highly desirable (as for example on the inside of the hull of a ship, as illustrated in the aforesaid U.S. Pat. No. 4,679,517), known fire retardant compositions which do not also possess good impact strength would not be useful.

Achievement of good impact strength, fire retardancy and freedom from toxic combustion products is very difficult to achieve. As is known in the art, achievement of one of these desired goals is usually attained at the expense of the others. In fact, applicants are not aware of any compression moldable composition of a particulate blend which achieves all three goals.

Compositions of this invention have an impact strength, as measured in the notched Izod test, of at least about 7 foot pound/inch of notch or at least about 35% of the impact strength of the unmodified molded UHMWPE.

The compositions of this invention emit only slight or moderate levels of smoke and essentially no toxic products on combustion, and accordingly contain essentially no halogen or materials which yield cyanide on combustion.

DISCLOSURE OF THE INVENTION

This invention according to one aspect provides compression molded polymeric compositions having good flame retardancy and high impact strength. In the finished molded or densified form these compositions are comprised of a maximum of 86 volume percent ultra high molecular weight polyethylene (UHMWPE), a minimum of 4.40 volume percent of a flame retardant compound (10 pph based on UHMWPE for ammonium polyphosphate on a weight basis) and a minimum of 6 volume percent of chopped reinforcing fibers (19.0 pph based on UHMWPE for chopped fiberglass on a weight basis). In addition, the bulk volume of the chopped reinforcing fibers used in the above composition as measured by a tapped density test described herein must be at least about 27 volume percent of the finished compression molded volume of flame retardant high impact composition. The maximum volume loadings of the flame retardant compound and chopped reinforcing fibers are only limited by the minimum requirement of 7 ft.—lb/inch width of notched izod impact strength, as long as both components are present above the minimum loadings described above.

This invention, according to a second aspect, provides a compression moldable particulate composition, comprising a high impact polymer in powder form—less than about 250 micron particle size, a flame retardant additive also in powder form—generally less than about 50 micron particle size, and a chopped non flammable reinforcing fiber,—usually in bundles or part bundles of 6–15 micron diameter glass fibers less than ¼" long. These particulate materials are easily blended by tumble blending at ratios that will provide the final molded volumetric compositions described in Aspect 1. Furthermore, the "bulk factor" of the chopped fibers should be sufficient to provide a minimum of bulk volume percent of 27% when expressed as a percent of the final molded volume of the part. (Both of these terms are explained at the end of this section). This bulk criteria for the chopped fibers ensures not only uniform dispersion of fibers in the final molded part for physical properties but also the desired flame retarding effects of the fibers when used in combination with the flame retardant additive.

This invention, according to a third aspect, provides a thin "compressible non-woven continuous non-flammable fiber veil—made up of single and multiple strands of 6–15 micron diameter fibers to be laid on top to the particulate blend described in aspect 2 prior to molding. During molding under heat and pressure, the veil compresses to about one-half its thickness and becomes impregnated with the flowing polymer, the flame retardant powder additives and any fine powder pigments that may be present, while "filtering out" the chopped fibers of the particulate blend which concentrate behind the veil. This provides significantly improved flame retardant properties at the surface with virtually no effect on the overall impact properties of the molded slab or sheet, since the compressed impregnated veil is generally less than 1% of the total thickness of the molded part.

This invention according to a fourth aspect provides a shaped article such as a sheet or slab, made of the aforesaid polymer compositions.

This invention according to a fifth aspect provides a composite laminate comprising first, second, and third layers. The first or surface layer is preferably molded with a compressable non-flammable non-woven continuous fiber veil on top of the particulate blend. The back layer is preferably molded with the particulate blend described in Aspect 2 and results in the final molded composition described in Aspect 1. The second layer is a flame retarded elastomeric layer containing no materials or additives which release halogens or cyanides when pyrolyzed. Thus all three layers of this high impact composite are flame retardant and release no halogens or cyanides upon combustion.

Through the specification and claims, applicants have specified volumetric compositions, expressed as "Vol % (molded)" of the finished molded (densified) compounds. In most cases, these volumetric compositions are also specified in parts of additives by weight per hundred parts of polymer (PHR). These are used for comparison. Since the compression molding "feed" for these moldings are either powders or chopped fibers, we are using a "bulk factor" for these materials and blends—this is simply the true density of the material or blend divided by the tapped (or pack) density of that material or blend—this tapped density being a uniform repeatable bulk density as determined by an ASTM test or modification described in the specification. In physical terms, a "bulk factor" of 4.0 means that the bulk volume after a tapped (or pack) density test is four times what it would be if it was fully densified and compressed to its true volume. Because applicants have determined that the bulk volume of the chopped fiberglass compared to the final molded (densified) volume of the particulate blend is critical to both the uniformity of composition of the molded slab and the flame retarding efficiency of the fibers we have further defined a term as "Bulk Volume Percent of Fiberglass expressed as a percent of the Final Molded Volume of the Part"—to be terms "BVPF" in the future. In physical terms, this is the tapped volume of chopped fiberglass determined by the tapped density test as a percent of the final volume of the molded part which contains all the ingredients of the composition described in Aspect 1. This can be calculated using the formula BVPF=Vol % (molded)×Bulk Factor. Therefore, in Aspect 1, using the 6 Vol % (molded) fibrous material minimum and a Bulk Factor of 4.48 for the preferred PPG1156—⅛" chopped fiberglass, we obtain BVPF=6×4.48=26.88 for the minimum BVPF—shown as 27 in Aspect 1 specifications.

BEST MODE FOR CARRYING OUT THE INVENTION

By far the preferred polymer (or base polymer) for compositions of this invention is ultra-high molecular weight polyethylene (UHMWPE). According to U.S. Pat. No. 4,753,982 to Orndoff, Jr., ultra-high molecular weight polyethylenes are generally classified as those having a weight average molecular weight of greater than 2.5 million, that is from about 3.0 million to about 7.0 million, using the solution viscosity method. Because of the extremely high molecular weight and resistance to flow above its melt point, UHMWPE is usually provided by the manufacturer in particulate or powder form to be converted by the fabricator to a finished shape, such as a slab or sheet, by means of compression molding or ram extrusion. The usual means of processing lower molecular weight thermoplastic polymers into finished shapes such as continuous extrusion, calendaring, and injection molding are not generally applicable with UHMWPE.

Other high impact strength polymers can be used as the base polymer instead of UHMWPE provided that the molded composition when compounded according to the present invention (i.e., with a minimum of 4.40 Volume percent of the flame retardant additive and a minimum of 6 Volume percents of the chopped fibers provided the BVPF is a minimum of 27 percent) has a notched Izod Impact strength of at least 7 foot pounds/in. width and further provided that no toxic fumes (i.e., halogen or cyanide) are emitted on combustion. The latter rules out halogen containing polymers such as PVC, as well as nitrile polymers and copolymers.

The flame retardant agent or combination thereof must be essentially water insoluble (so that it will not be leached out by water or atmospheric moisture, and must not give any toxic products of combustion. The latter requirement precludes halogenated compounds. The preferred flame retardant agent is ammonium polyphosphate, which may be made in accordance with U.S. Pat. No. 3,397,035. Ammonium polyphosphate is preferably microencapsulated and coated with a very thin coating of melamine formaldehyde resin to minimize water solubility. Ammonium polyphosphate is commercially available from Hoechst Celanese Corporation, Somerville, N.J., under the Trademarks "Exolit" 422 and "Exolit" 462.

Both are recommended by the manufacturer as flame retardant additives but not as single package flame retardant systems. "Exolit" 422 has a reported water solubility of less than 1.0 gram/100 g water. "Exolit" 462, which is a melamine-formaldehyde encapsulated ammonium polyphosphate, is reported to have a water solubility less than 0.1 g/100 g water. Either of these materials, or a mixture of the two, is used in a minimum volume percent loading of 8% based on the finished molded part.

Other powdered flame retardant additives, in general, are not useful in compositions of this invention. For example, "Char Guard" (TM) 329, a proprietary powder blend of bis melaminium pentate and a polyhedric oxide sold by the Great Lakes Chemical Corporation, West Lafayette, Ind., functions well as a single package flame retardant for UHMWPE when blended with UHMWPE and compression molded. However, the volumetric levels of "Char Guard" 329 required to obtain desired flame retardance are extremely detrimental to the impact strength of the molding with only about one percent of the original UHMWPE impact strength retained. In contrast, at similar volume loadings of ammonium polyphosphate in UHMWPE, at least one-third of the UHMWPE impact strength is retained in the molded samples. It should be noted here, however, that ammonium polyphosphate by itself does not impart the desired flame retardant properties at these or even higher volume loadings.

The other essential ingredient, chopped reinforcing fibers and preferably chopped glass fibers (commonly known as fiberglass) are also present at a minimum level of 6 volume percent of the final molded sample. These chopped glass fibers or more correctly bundles or part bundles of individual 6–15 micron diameter glass fiber strands about ⅛–¼" long help retain or increase impact strength of the ammonium polyphosphate loaded UHMWPE while at the same time imparting key improvements in flame retardance—in particular stopping flaming drip and reducing flame spread in fire situations.

A further requirement for the chopped fibers is a relatively high bulk volume of the chopped fiberglass, which, as a percentage of the volume of the finished compression molded part containing the entire compound, should be at least about 27 percent. This is known as "BVPF" (previously defined). This is a product of the molded volume percent [Vol % (molded)] of the chopped fiberglass times its "bulk factor". "Bulk factor" for the chopped fiberglass strand is defined herein as the true density of the material divided by its "tapped density".

Tapped density in turn is the density of a powder or fibrous material measured by a standard test method, ASTM 4164-82. The powder and powder/fiber blends can be tested with no modifications to the procedure and uniform, repeatable results are obtained. For chopped fiberglass, however, the test is modified to include a vibratory feeder which feeds the chopped fiberglass uniformly, to the tapping 250 ml. graduated cylinder during the first 400 taps of the total 1000 tape procedure. This provides very uniform repeatable results for the chopped fiberglass tapped density. Tapped density of a material is slightly higher than the apparent density of the same material, since tapping of the cylinder wall causes a slight degree of compaction, while apparent density is measured in the uncompacted state.

A preferred chopped glass fiber material is PPG 1156, made by PPG Industries, Pittsburgh, Pa. PPG1156 consists of ⅛ inch nominal length of fiberglass strand and in which the individual fibers that make up the chopped strand bundles are between 6 and 15 microns in diameter. No individual glass fibers are finer than 6 microns in diameter. A typical fiber bundle in this product is approximately 0.138 inch long×0.040 inch wide×0.002 inch thick. A typical tapped density of this product is 0.573 g/cc. Since the true density is 2.57 g/cc, the bulk factor is 2.57/0.573=4.48. The BVPF at the minimum volume loadings of fiberglass (6 Vol %) would be 27% for this material to produce an acceptable product according to this invention.

Another chopped fiberglass which was tested, i.e., OC 415 CA, made by Owens-Corning Fiberglass Corp., Toledo, Ohio. This material is a 3/16 inch nominal length chopped fiberglass strand in which the individual fibers are between 6 and 15 microns in diameter. A typical fiber bundle is 0.202" long×0.52 inch wide×0.0048 inch thick. The typical tapped density of this product, measured in the same way as described above, is 0.871 g/cc. Since the true density is 2.57 g/cc, the bulk factor is 2.57/0.871=2.95. The BVPF for the OC415CA chopped fiberglass at the minimum Vol% (molded) level for this invention (6%) is 6%×2.95=17.7%. This is well below the minimum BVPF required for this invention and therefore not suitable at 6 Vol % (molded) loading levels. In order to become effective for this invention, the Vol % (molded) of OC415CA would have to be raised to 9.15% (i.e., 27%/2.95) in order to satisfy both the minimum criterial for Vol % (molded)=6% and the minimum BVPF (27%). In general, chopped fiberglass with the higher "bulk factors" (i.e., 3.5 or above) are preferred for this invention.

Although carbon fibers and other mineral fibers may be used instead of or as a partial replacement for chopped glass fibers, chopped glass fibers are preferred because they give good reinforcement and flame retardant properties at low cost.

Other ingredients, such as colorants, ultraviolet (UV) stabilizers, etc. may be present but are not essential. For example, a small amount of carbon black, e.g., from about 0.02 to 0.80 Vol % (molded) and typically about; 0.05 to 0.40 Vol % (molded) may be added as a colorant so that the layer 16, which would be white and highly visible in the absence of a colorant, will be gray and less visible. Carbon black also improves the UV resistance of the product.

As noted before, the combination of flame retardant additive or additives and chopped reinforcing fibers according to this invention is very important in order to get the optimum combination of impact and flame retardant properties.

Combination of a flame retardant additive or mixture thereof and chopped fibers appears to be a synergistic combination imparting acceptable impact strength, i.e., at least about 35 percent of that of uncompounded UHMWPE, good flame retardant properties, absence of "flaming drip", the phenomenon exhibited by dripping candle wax in a burning candle, and low coefficient of friction so that objects (such as ships) which strike this surface, tend to glance off. The absence of flaming drip is remarkable since the preferred fire retardant additive by itself, in the absence of chopped fiber reinforcement, results in a composition in which flaming drip takes place. Preferred compositions of this invention, containing UHMWPE as the base polymer, exhibit notched Izod impact strength of at least 7 foot pounds per inch of notch. These compositions also exhibit a dynamic coefficient of friction less than 0.2 against cold rolled steel.

Figure 1:
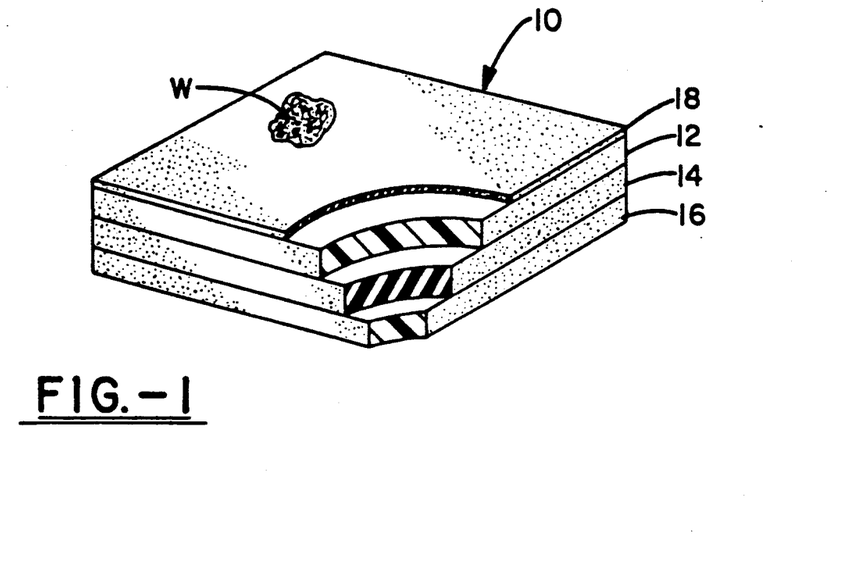
FIG. 1 is a schematic view of a composite laminate according to this invention.
Figure 2:
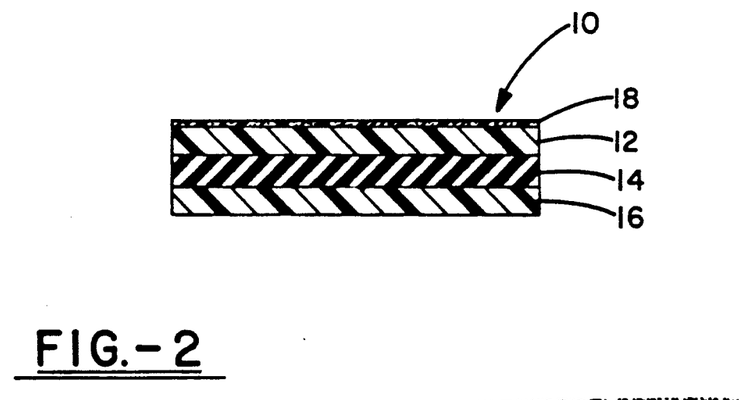
FIG. 2 is a cross sectional view of a composite laminate according to this invention.

Compositions as above described may be formed into slabs of desired thickness. That slab may be adhered directly to a wall or other hard surface to be protected, e.g., by means of an adhesive, or preferably may be laminated to form a composite laminate as shown in FIGS. 1 and 2 and as hereinafter described. In either case, the thickness of the slab of a composition as above described will be from about ½ to 3 inches depending upon the degree of fire retardancy and the degree of impact protection required.

Figure 3:
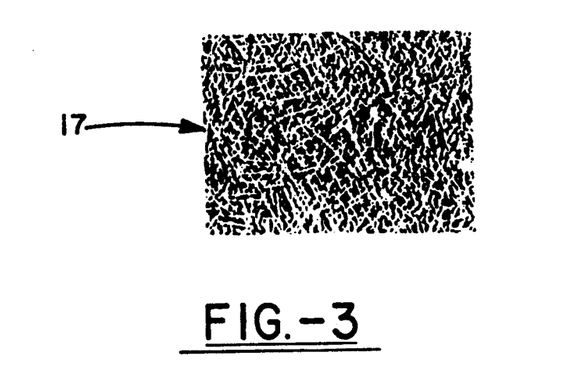
FIG. 3 is a top view of a compressible continuous non-woven fiberglass veil used in one aspect of this invention.

The composite laminate of this invention will now be described with reference to FIGS. 1, 2, and 3. Referring now to FIGS. 1 and 2, 10 is a composite laminate having impact resistant and flame retardant first layer 12 of UHMWPE containing a minimum of 8 Vol (molded) flame retardant additive and at least about 6 Vol % (molded) of chopped glass fibers as above described, a second layer 14 of elastomeric material, and an impact resistant third layer 16, which preferably also has a composition in accordance with this invention, i.e., UHMWPE containing a minimum of 8 Vol % (molded) of flame retardant additive and about 6 Vol % (molded) of chopped glass fibers. A thin, flexible sheet or "veil" of non-woven glass fiber cloth shown in top view as 17 in FIG. 3 is preferably placed on the outer surface of first layer 12. During compression molding the thin sheet or veil becomes impregnated with the melted flowing UHMWPE, the powdered flame retardant additive and any other powder pigments or additives from the particulate composition below it while trapping or "filtering" any chopped fibers from that adjacent particulate composition below the veil. In addition the veil is compressed to about one-half of its original thickness during the compression molding operation. This impregnated compressed molded veil is shown as 18 in FIGS. 1 and 2.

The base material of the second layer 14 is an elastomer having high energy absorption and which preferably does not emit toxic fumes in the event of combustion. The elastomeric layer 14 is preferably compounded with a suitable flame retardant additive or mixture thereof. Any of the conventional hydrocarbon rubbers, such as EPDM (polymer of ethylene-propylenediene monomer), polymerized isoprene, etc., can be used as the base material, but EPDM is preferred. Styrene containing elastomers such as SBR are usually avoided because of the tendency to generate black smoke during pyrolysis. Elastomeric polyurethanes are avoided because of the toxic fumes which they emit on combustion. Conventional fire retardant additives which do not generate halogens or cyanides in pyrolyis, e.g., alumina trihydrates, can be used to obtain fire retardancy.

The flexible cloth or veil 17 is a non-woven veil of randomly extending long continuous fibers, preferably silane treated glass fibers or filaments ranging from 6 microns to 20 microns in diameter, in a polymeric (e.g. polyester) binder. The thickness of the fiberglass veil is typically about 0.010 inch prior to formation of laminate 10 by compression molding; during molding this veil compresses to a thickness of about 0.005 inch while being impregnated by UHMWPE, flame retardant additives and pigments from the particulate composition of layer 12 to become surface layer 18. At the same time, chopped fiberglass from the particulate composition of layer 12 is trapped behind the veil during the molding process by the "filtering action" of the veil. It will be understood that these thicknesses and even the selection of glass as the fibrous material are not critical. The thickness of veil 17 may vary from approximately 0.005 to about 0.020 inch prior to formation of laminate 10, and long fine continuous carbon filaments can be substituted for glass, if desired. The non woven matrix should be such that all powder and UHMWPE ingredients of the neighboring particulate composition penetrate the veil while the chopped fiberglass remains trapped or filtered under the veil.

An essentially non-combustible fibrous material should be selected so that the impregnated compressed veil 18 will perform its fire retardancy function.

The UHMWPE layers 12 and 16 become firmly bonded to the elastomeric layer 14 during the molding process hereinafter described for making a composite laminate 10.

The overall thickness of laminate 10, and the relative thicknesses of the various layers, are as required to achieve the desired impact resistance and fire retardancy. Normally the elastomeric layer 14 is from about 30 percent to about 60 percent of the total thickness of the laminate, and the two UHMWPE layers 12 and 16 are each from about 20 to about 35 percent of the total thickness of the laminate. Normally layers 12 and 16 are of equal or nearly equal thickness. The three layers 12, 14 and 16 in a preferred laminate may be of substantially equal thickness. For protection of the inside of a hull of a ship, as described for example in U.S. Pat. No. 4,679,517, the layers may have an overall thickness of about 3.0 to about 4 inches, first and third layers each being about 0.75 to about 1.25 inch thick and the second layer 14 constituting the remainder of the thickness.

The composite laminate 10 is installed on a surface to be protected, such as a wall, a wharf or the inside of the hull of a ship (the latter as taught in U.S. Pat. No. 4,679,517), so that the third layer 16 of the laminate is attached to the surface to be protected. This may be done by a suitable means, as for example by the use of suitable adhesives or mechanically with the use of bolts or studs. The first layer 12 then becomes the impact layer, i.e., the layer which is exposed to any blows and any flame to which the composite laminate 10 may be subject. The impregnated veil layer 18 may be present and may increase flame retardancy as explained previously. This "impregnated compressed veil" is interposed between first layer 12 and the source of flame. The elastomeric second layer 14, with its high energy absorption, acts as a cushioning layer.

Both the compounded UHMWPE layer 12 and a composite laminate 10 according to this invention can be made by conventional compression molding techniques.

All ingredients of layers 12 and 16 except glass fibers are supplied in powder form. The glass fibers are supplied in the form of short, chopped fibers. The elastomeric layer 14 of compounded elastomer (e.g., EPDM) with flame retardant additive (e.g., alumina trihydrate) is formed by conventional rubber compounding techniques, e.g., master batching in a Banbury mixer, mixing on a mill, followed by calendaring into thin (e.g., 0.125 in.) sheets. These sheets have a chemical curative in them (e.g. peroxide) which allows the elastomer to "cure" or crosslink during the compression molding cycle.

A uniform blend of ingredients forming the third layer 16 is charged to the mold. The amount charged is sufficient to give a thickness about 2.0 times the desired thickness of the layer 16 in the finished laminate, since the "bulk factor" of this particulate blend is about 2.0. If the BVPF of the chopped fiberglass in this composition is at least about 27 Volume percent, a uniform particulate blend will be obtained by simple tumble blending.

Next, enough sheets of unvulcanized compounded elastomer to give a layer 14 of desired thickness are charged to the mold. The unvulcanized elastomer does not compress, and so the thickness of the stack of sheets charged to the mold is essentially the same as the thickness as the desired layer 14.

Next, a uniform blend of the ingredients forming first layer 12 is charged to the mold. This layer and layer 16 preferably have the same composition. Again, tumble blending may be used to obtain a uniform blend of ingredients, and the chopped fibers should have a BVPF of at least about 27%.

Finally, the non-woven glass cloth or "veil" 17 is gently laid on top of the particulate blend which forms layer 12. This will form the impregnated compressed veil layer 18 in the finished composite.

The mold is then closed and heat and pressure are applied. The platen temperature of the press may range from about 320° F. to about 380° F. and the molding pressure may range from about 900 to about 1300 psig. Because of heat transfer consideration through the thickness of both the mold and the laminate composition the press heat cycle may be from 1½ to 4 hrs. with the criteria that all ingredients in the composite reach at least about 320° F. and the elastomer layer is subjected at least to the equivalent rubber cure of 45 minutes at 320° F. Since the preferred EPDM elastomer compound is particularly resistant to cure "reversion", extended cures up to four hours at these temperatures will not significantly affect the cured elastomer physical properties. The mold must be cooled sufficiently so that the entire composite is below the UHMWPE crystalline melt temperature of 273° and preferably below 150° F., before the pressure is released and the composite part is removed. The resultant product is a strongly bonded laminate as illustrated in the drawings.

A preferred formulation according to this invention, hereinafter designated as Formulation 1, is as follows:

|  | Vol % (molded) | (phr) |
| --- | --- | --- |
| UHMWPE ("Hostalen" GUR 413) | 79.02 | (100 phr) |
| Ammonium polyphosphate ("Exolit 462") | 12.11 | (30 phr) |
| Chopped (¼") glassfibers (PPG 1156) | 8.67 | (30 phr) |
| Carbon black (Monarch 700) "fluffy" black | 0.20 | (0.5 phr) |
| Total | 100.00 | 160.5 |

Composite laminates according to this invention are useful in any situation where both protection from impact and flame retardancy are required. One specific use, as previously indicated, is on the inside of a hull of a ship, as described in U.S. Pat. No. 4,679,517 previously cited. It may also be used in bulkheads of ships, on docks, on the inside walls of shipping containers and trucks, and on both interior and exterior walls of warehouses where protection from impact as well as from the spread of fire is required. They can also be used as impact structures in underground deep shaft mines where flame retardancy and low toxicity pyrolysis products would be critical.

Compounded polymer compositions achieve the unusual combination of both good flame retardancy low combustion toxicity and good impact resistance, a combination which is very difficult to achieve as explained earlier. Composite laminate 10 of this invention gives an extraordinary measure of protection from both impact and spread of fire.

EXAMPLES

This invention will now be described further with reference to the examples which follow.

Materials used in the examples are as follows.

UHMWPE—"Hostelen" GUR 413, a free-flowing powder 100 percent through 60 mesh (250 micron) screen, true density 0.940 g/cc; typical tapped density 0.509 g/cc; typical bulk factor 1.85. Sold by Hoechst Celanese Corp., Pasadena, Tex.

Ammonium polyphosphate (non-encapsulated)—'-'Exolit" 422, true density 1.9 g/cc; average particle size 18 microns; solubility less than 1.0 g/100 g water. Made by Hoechst Celanese Corp., Specialty Chemicals Group, Somerville, N.J.

Ammonium polyphosphate (encapsulated with melamine resin). "Exolit" 462. Average particle size=22 microns; solubility less than 0.1 gms/100 gms water; true density 1.84 gm/cc; tapped density=1.064 gm/cc; bulk factor=1.73 Made by American Hoescht Corporation, Specialty Chemicals Group, Somerville, N.J.

"Char-Guard" 329—a powder blend of bis-melaminium pentate and polyhedric oxide; 100 percent through 60 mesh (250 micron) screen; true density 1.80 gm/cc; Made by Great Lakes Chemical Corp., West Lafayette, Ind. (used for comparison purposes only).

Chopped fiberglass—PPG 1156 C.S., which is a ¼ inch nominal length chopped fiberglass in which the individual fibers which make up the chopped strand bundles are between 6 and 15 microns in diameter. A typical fiber bundle in the product is approximately 0.138 inch long×0.040 inch wide×0.002 inch thick. Typical tapped density 0.573 g/cc; true density 2.57 g/cc; bulk factor 4.48. Sold by PPG Industries, Pittsburgh, Pa.

Chopped fiberglass—415CA, 3/16 inch nominal length chopped fiberglass strand in which the individual fibers that make up the chopped strand bundles are between 6 and 15 microns in diameter. A typical fiber bundle is approximately 0.202 inches×0.052 inch wide×0.0048 inch thick. Typical tapped density 0.871 g/cc; true density 2.57 g/cc; bulk factor 2.95. Sold by Owens-Corning Fiberglass Corp., Toledo, Ohio.

Carbon black "Monarch" 700 produced and sold by Cabot Corp., Atlanta, Ga. This is a "fluffy" carbon black whose fluffy nature allows for easy dispersion and maximum pigmentation in a powder or a powder/fiber blend. True density 1.82 g/cc; typical tapped density 0.168 g/cc; bulk factor 10.83.

Fiberglass veil—"SURMAT" 100, 10%—176 polyester bonded, silicone treated, randomly patterned, continuous filament fiberglass having filaments ranging from 6 to 20 microns in diameter. Thickness 0.010 inch before molding, 0.005 inch after molding. True density 2.57 gm/cc; Bulk density (non-woven)=0.1705 gm/cc; Bulk factor (non-woven)=15.08. Sold by Microfibers, Inc., Shawnee, Ohio.

Elastomer for layer 14—"Polysar" 5465—oil extended EPDM containing 50 percent by weight of EPDM polymer solids and 50 percent by weight of a napthlenic processing oil, produced and sold by Polysar Ltd., Orange, Tex.

"Age Rite" Resin D (trimethyldihydroquinone) produced and sold by B. F. Goodrich Chemical Co., Akron, Ohio.

"DiCup" 40 C (dicumyl peroxide/calcium carbonate, 40 percent/60 percent by weight)—produced and sold by Hercules, Wilmington, Del. and Gibstown, N.J.

"Saret" 500 (acrylic monomer coagent)—produced and sold by Sartomer Co., Westchester, Pa.

Preparation "A"

This describes the preparation of flame retardant EPDM layer 14.

The recipe for the flame retardant EPDM layer is as given in Table I below.

TABLE I

| Ingredient | True Density (gm/cc) | Vol % (Molded) | (phr) |
|---|---|---|---|
| Polysar 5465 | 0.90 | 40.03 | (200.00) |
| Continex 550 FEF Black | 1.82 | 9.90 | (100.00) |
| Stearic Acid | 0.92 | 0.39 | (2.00) |
| Alumina Trihydrate | 2.42 | 37.21 | (500.00) |
| Zinc Oxide | 5.63 | 0.16 | (5.00) |
| Paraffinic Resin | 0.97 | 1.86 | (10.00) |
| Agerite Resin D | 1.08 | 0.33 | (2.00) |
| Paraffinic Oil | 0.89 | 8.10 | (40.00) |
| Dicup 400 | 1.53 | 1.18 | (10.00) |
| Saret 500 | 1.06 | 0.84 | (5.00) |
| Totals | 100.00 | | (874.00) |

*Calculated molded density = 1.574/gm/cm$^3$

All ingredients except "Di Cup" 40C are masterbatched in a Banbury mixer. The masterbatch is transferred to a mill, "Di Cup" 40C is added on the mill at temperatures below 160° F. The mixed compound is then calendared into sheets each 0.125 inch thick at a relatively low calendaring temperature, i.e. about 160° F., to avoid scorch or precure of stock. The uncured sheets are ready for charging into a mold, as will be described in Example 5.

Sample sheets are cured at 350° F. Optimum cure at this temperature is 5–15 minutes for thin sheets although very little change, (i.e. reversion) of physical properties is noted at times up to 4 hours. Physical tensile properties of a sheet cured for 1 hour at 350° F. are as follows:

Tensile strength = 384 psi, 300 percent modulus = 346 psi, elongation at break = 388 percent. Hysteresis properties (ASTM D 623) of a sample cured 4 hours at 350° F. are as follows:

77° F. base temperature and 13.4 percent static compression; delta T = 183° F., compression set = 11.1 percent; 170° F. base temperature and 15.6 percent static compression; delta T = 115° F., compression set = 14.3 percent.

A small amount, i.e. up to 5 phr of silicone rubber, e.g. "SILPLUS" SE6350 can be added to the above compound as a processing aid without affecting physical properties or flame resistance. "SILPLUS" silicone elastomers are made and sold by General Electric Co., Silicone Products Division, Waterford, N.Y.

Tests Referred to in Examples 1–5

B. F. Goodrich Radiant Panel Flame Test. This test compares flame spread and heat evolution of a 3 inch wide × 4.5 inch high × 0.5 inch thick test sample against the flame spread and heat evolution of a 3 inch wide × 4.5 inch high × 0.5 inch thick test sample of pure (uncompounded) UHMWPE under similar test conditions. The test is carried out in an NBS Smoke Chamber Unit, mounted on its side so that the test sample is vertical when mounted in the holder of the unit. The unit is equipped with two electrical radiant panel heaters, which are adjusted to provide a uniform heat flux of 2.5 watts/cm$^2$ over the top 3 inch × 3 inch surface of the sample. The unit is also equipped with one torch orifice, fed by a butane tank at a constant gas pressure of 15 psig, which produces a pencil-shaped flame approximately 2 inches long. The torch flame tip is directed at a point vertically at the top 1/16 inch of the test sample and horizontally at the middle of the test sample. The apparatus is also equipped with a thermocouple chimney, containing three (3) thermocouples, and located directly above the test apparatus. These thermocouples measure the average temperature of the exhaust gas during the test.

A non-combustible, inorganic asbestos cement block 3.0 inches × 4.5 inches × 0.5 inches is placed in the sample holder of the apparatus, heated by means of the radiant panel heaters and the directed torch flame, and kept in place until equilibrium temperature (usually in the 50°–60° C. range) is reached. All temperatures are recorded with a continuous recorder. After temperature equilibrium is reached, the inorganic block is removed and replaced by a test sample.

The total time of the test is 10 minutes. The surface of the sample is marked in ½ inch increments vertically so that vertical flame spread rate can be measured as a function of time. The time at which the flame traverses down 2.5 inch is one of the test result criteria. Exhaust temperature is also continuously recorded. After the test, heat evolution which is measured by the temperature increase over the baseline temperature, is integrated over the 10 minute period of the test and is compared to that obtained for solid UHMWPE control sample which is run in every series. By definition, UHMWPE control heat evolution rating is 100 for any given series and all samples are expressed as a percentage of that control.

Reasonably good correlation has been found to exist between results obtained in the above described BFG Radiant Panel Flame Test and ASTM test E 162. It should be noted that the ASTM test combines the flame spread rates and heat evolution results into a "flame spread index" rating. The BFG Radiant Panel Flame Test is used for compound screening and has the advantages of smaller sample size and only 1 sample per test, compared to 4 samples 6 inches × 18 inches × 0.75 inches required for the ASTM E162 test.

Tapped Density Test. The tapped density test for all pure powders and powder-fiberglass blends used in compression moldings described in this application is determined by ASTM method D4164-82 using a "Quantachrome" dual-auto tap machine, made and sold by Quantachrome Corp., Syosset, N.Y. To measure the tapped density of glass fibers, the method is modified to include a vibratory feeder which is calibrated to feed the total amount of chopped strand to the graduated cylinder at a uniform feed rate during the first 400 taps plus or minus 20 taps or 95 seconds plus or minus 5 seconds. The total test consists of 1000 taps and then the unit shuts off for the volumetric measurement to be made. Virgin (as received) chopped fibers are always used to provide consistent results.

It will be apparent that the tapped density, or apparent packing density, of a fibrous or powdery material is always slightly to somewhat greater than the apparent bulk density of the same material, since tapped density is measured in a test in which some compaction due to tapping of a container of the material takes place, while apparent bulk density is measured without any compaction.

The tapped density test allows one to define two terms used in the specifications and claims which are considered critical to the invention. One is "bulk factor" which is the true density of the material or blend divided by its tapped density. Another term, BVPF, is the bulk volume of the chopped fiberglass strands as measured by the tapped density test divided by the molded volume of all the ingredients of the composition (i.e. UHMWPE, flame retardant additive, chopped fiberglass, pigments, etc.) which includes the densified chopped fiberglass. This is calculated by multiplying the Vol% (molded) chopped fiberglass times the "bulk factor" of the chopped fiberglass.

Notched Izod Impact Strength

This is the impact test according to ASTM D256-81, method A. The results are recorded in ft-lbs/inch width.

Dynamic Coefficient of Friction

The $3'' \times 6'' \times \frac{1}{2}''$ molded blocks were tested according to ASTMD1894 against cold rolled steel, using 10.51 # of normal force on 1 in.$^2$ surface at 20" per minute sled speed.

ASTM E162—83

Surface Flammability of Materials Using A Radiant Panel Heat Source

This is a larger scale flame test which was run by an independent test lab U.S. Testing in Fairfield, N.J. The test requires 4 each of larger panels ($6'' \times 18'' \times \frac{3}{4}''$) and test output includes flame spread factor, Fs, heat evolution factor Q, and the flame spread index, $I_S = F_S \times Q$.

EXAMPLE 1

This example shows the effects of varying the quantities of chopped fiberglass (PPG 1156-$\frac{1}{4}''$ CS) and ammonium polyphosphate (Exolit 462) on flame retardancy, impact strength and dynamic coefficient of friction in UHMWPE-based compositions.

Quantities of materials calculated to give the volumetric compositions as set forth in Table II below and to yield molded samples 3 inches × 6 inches × ½ inch are charged to the mold cavity of a steel compression mold 3 inches × 6 inches × 1.5 inches high and equipped with a sectional plunger. Shims are placed on the sides of the molds so that the top plunger section will stop at the desired 0.500" thickness during molding.

A 5 percent excess of each ingredient is charged to the mold cavity to allow for flash and pressure densification during molding. Platen a press under just contact pressure and allowed to preheat for 20 minutes. After 15 minutes, the mold is pressurized to 1157 psi and maintained at this pressure for 40 additional minutes by adjusting the ram force as required. After that time, the internal mass has reached a temperature of at least 340° F. The mold is then cooled by flowing water through the cored platen. Pressure of 1157 psi is maintained until the molded slab is cooled to below 140° F. Then the press is lowered and the part removed.

Compositions tested were a UHMWPE control which contained no additive, (Sample 1), a composition containing the preferred flame retardant (Exolit 462) but no glass fibers (Sample 1A), a composition containing the preferred glass fibers (PPG 1156 CS) but no flame retardant additive (Sample 1B), compositions containing both glass fibers and flame retardant (Samples 1C, 1D and 1E). Sample 1E represents the preferred composition. Also tested were a UHMWPE composition containing "Char Guard" 329, which is understood to be a powder blend of bis melaminium pentate and polyhedric oxide sold by Great Lakes Chemical Corp., West Lafayette, Ind. (Sample 1F). Also tested was a sample of Douglas fir wood of #1 density—West Coast Lumber Inspection Bureau specification (Sample 1W). Tests carried out were the BFG Flame Radiant Panel test as above described, the notched Izod impact test (ASTM D 256, Method A), and the dynamic coefficient of friction test (ASTM D 1894).

Compositions and results are shown in Table II (on a separate sheet of paper below.)

TABLE II

| Ingredient | True Density (gm/cc) | 1 UHMWPE Control Vol. % (Molded) | (PHR) | 1A Vol. % (Molded) | (PHR) | 1B Vol. % (Molded) | (PHR) | 1C Vol. % (Molded) | (PHR) |
|---|---|---|---|---|---|---|---|---|---|
| Hostelen GUR 413 | 0.940 | 100.00 | (100.00) | 86.32 | (100.00) | 90.11 | (100.00) | 86.15 | (100.00) |
| ¼" PPG 1156 C.S. | 2.570 | 0.00 | (0.00) | 0.00 | (0.00) | 9.89 | (30.00) | 9.45 | (30.00) |
| Exolit 462 | 1.84 | 0.00 | (0.00) | 13.23 | (30.00) | 0.00 | (0.00) | 4.40 | (10.00) |
| Chargard 329 | 1.80 | 0.00 | (0.00) | 0.00 | (0.00) | 0.00 | (0.00) | 0.00 | (0.00) |
| Carbon Black | 1.82 | 0.00 | (0.00) | 0.45 | (1.00) | 0.00 | (0.00) | 0.00 | (0.00) |
| Douglas Fir | 0.530 | 0.00 | (0.00) | 0.00 | (0.00) | 0.00 | (0.00) | 0.00 | (0.00) |
| TOTAL | | 100.00 | (100.00) | 100.00 | (131.00) | 100.00 | (130.00) | 100.00 | (140.00) |
| Calc. Molded Dens., gm/cc | — | 0.940 | — | 1.063 | — | 1.101 | — | 1.130 | — |
| Bulk Factor, Fiberglass | — | N/A | — | N/A | — | 4.48 | — | 4.48 | — |
| BVPF, Fiberglass | — | N/A | — | N/A | — | 44.31 | — | 42.34 | — |
| BFG Radiant Panel Flame Test | | | | | | | | | |
| Time to 2.5", Sec. | — | 114 | — | 199 | — | 250 | — | 409 | — |
| Heat Evolution, % of UHMWPE Control | — | 100 | — | 78 | — | 119 | — | 88 | — |
| Flame Drip? | — | Yes, 205 sec. | — | Yes | — | No | — | No | — |
| Izod Impact, Notched | | | | | | | | | |
| Ft. lb/in. Width (ASTM D-256 Method A) | — | 19.3 | — | 6.9 | — | 15.8 | — | 14.8 | — |
| Dynamic Coef. of Friction | | | | | | | | | |
| Cold Rolled Steel (ASTM D-1894) | — | 0.102 | — | 0.116 | — | 0.130 | — | 0.127 | — |

| Ingredient | 1D Vol. % (Molded) | (PHR) | 1E Vol. % (Molded) | (PHR) | 1F Vol. % (Molded) | (PHR) | 1W Douglas Fir #1 Dense Vol. % (Molded) | (PHR) |
|---|---|---|---|---|---|---|---|---|
| Hostelen GUR 413 | 82.55 | (100.00) | 79.18 | (100.00) | 86.46 | (100.00) | 0.00 | (0.00) |
| ¼" PPG 1156 C.S. | 9.06 | (30.00) | 8.69 | (30.00) | 0.00 | (0.00) | 0.00 | (0.00) |
| Exolit 462 | 8.39 | (20.00) | 12.13 | (30.00) | 0.00 | (0.00) | 0.00 | (0.00) |

TABLE II-continued

| | | | | | | | | |
|---|---|---|---|---|---|---|---|---|
| Chargard 329 | 0.00 | (0.00) | 0.00 | (0.00) | 13.54 | (30.00) | 0.00 | (0.00) |
| Carbon Black | 0.00 | (0.00) | 0.00 | (0.00) | 0.00 | (0.00) | 0.00 | (0.00) |
| Douglas Fir | 0.00 | (0.00) | 0.00 | (0.00) | 0.00 | (0.00) | 100.00 | (100.00) |
| TOTAL | 100.00 | (150.00) | 100.00 | (160.00) | 100.00 | (130.00) | 100.00 | (100.00) |
| Calc. Molded Dens., gm/cc | 1.163 | — | 1.191 | — | 1.056 | — | 0.530 | — |
| Bulk Factor, Fiberglass | 4.48 | — | 4.48 | — | N/A | — | N/A | — |
| BVPF, Fiberglass | 40.59 | — | 38.93 | — | N/A | — | N/A | — |
| BFG Radiant Panel Flame Test | | | | | | | | |
| Time to 2.5", Sec. | 423 | — | 458 | — | 528 | — | 64 | — |
| Heat Evolution, % of UHMWPE Control | 66 | — | 64 | — | 50 | — | 70 | — |
| Flame Drip? | No | — | No | — | No | — | No | — |
| Izod Impact, Notched | | | | | | | | |
| Ft. lb/in. Width (ASTM D-256 Method A) | 11.0 | — | 10.3 | — | 0.2 | — | 4.7 | — |
| Dynamic Coef. of Friction | | | | | | | | |
| Cold Rolled Steel (ASTM D-1894) | 0.113 | — | 0.124 | — | 0.070 | — | 0.251 | — |

Data on Table II show the sample containing the chopped fiberglass as the sole additive (1B) had no flaming drip and excellent impact strength but had unacceptable flame spread rate and heat evolution. The sample containing the ammonium polyphosphate alone (1A) had lower heat evolution, but had unacceptable flame spread and showed flaming drips during the burn test. Sample 1A also had low impact strength, although the value of 6.9 ft-lbs/inch width was generally considerably higher than other powdered flame retardant additives compression molded with UHMWPE. Combinations containing both chopped fiberglass and ammonium polyphosphate (1C, 1D, 1E) had good flame retardance and impact strength, particularly 1D and 1E—1E is the preferred composition. Sample 1F (Char-Guard 329), containing a "single package flame retardant powder blend" had excellent flame retardant properties but impact strength was virtually nil, a phenomena observed with most other "single package" powder flame retardant additives. Douglas Fir (Sample 1W), sometimes used as a component (timber) in "sacrificial" impact structures, showed much lower flame spread resistance and much lower impact strength than the samples made according to this invention.

EXAMPLE 2

This example describes a series of experiments in which Samples (2A through 2E) containing varying amounts of chopped glass fibers and ammonium polyphosphate in addition to UHMWPE were prepared and tested. These compositions were prepared and tested in the same manner as those described in Example 1. Also tested were a UHMWPE control (Sample 2) and Douglas fir wood #1 density (Sample 2W).

Sample 2A herein had a composition the same as that of Sample 1E in Example 1; these samples represent the preferred composition. While test results of Sample 2A and control 2 in this example are not identical to test results of Samples 1E and control 1, respectively, in Example 1, the results are sufficiently close to be within normal experimental error.

Compositions prepared and test results obtained in this example are shown in Table III (separate sheet).

TABLE III

| | | 2 UHMWPE Control | | 2A | | 2B | | 2C | |
|---|---|---|---|---|---|---|---|---|---|
| Ingredient | True Density (gm/cc) | Vol. % (Molded) | (PHR) | Vol. % (Molded) | (PHR) | Vol. % (Molded) | (PHR) | Vol. % (Molded) | (PHR) |
| Hostelen GUR 413 | 0.940 | 100.00 | (100.00) | 79.18 | (100.00) | 80.81 | (100.00) | 79.64 | (100.00) |
| ⅛" PPG 1156 C.S. | 2.57 | 0.00 | (0.00) | 8.69 | (30.00) | 8.87 | (30.00) | 10.19 | (35.00) |
| Exolit 462 | 1.84 | 0.00 | (0.00) | 12.13 | (30.00) | 10.32 | (25.00) | 10.17 | (25.00) |
| Douglas Fir | 0.530 | 0.00 | (0.00) | 0.00 | (0.00) | 0.00 | (0.00) | 0.00 | (0.00) |
| TOTAL | | 100.00 | (100.00) | 100.00 | (160.00) | 100.00 | (155.00) | 100.00 | (160.00) |
| Calc. Molded Dens., gm/cc | — | 0.940 | — | 1.191 | — | 1.177 | — | 1.198 | — |
| Actual Molded Dens., gm/cc | — | 0.92 | — | 1.162 | — | 1.143 | — | 1.167 | — |
| Bulk Factor, Fiberglass | — | N/A | — | 4.48 | — | 4.48 | — | 4.48 | — |
| BVPF, Fiberglass | — | N/A | — | 38.93 | — | 39.74 | — | 48.88 | — |
| BFG Radiant Panel Flame Test | | | | | | | | | |
| Time to 2.5", Sec. | — | 112 | — | 438 | — | 390 | — | 398 | — |
| Heat Evolution, % of UHMWPE Control | — | 100 | — | 66 | — | 76 | — | 73 | — |
| Flame Drip? | — | Yes 215 sec. | — | No | — | No | — | No | — |
| Izod Impact, Notched | | | | | | | | | |
| Ft. lb/in. Width (ASTM D-256 Method A) | — | 19.5 | — | 9.9 | — | 11.8 | — | 11.2 | — |
| Dynamic Coef. of Friction | | | | | | | | | |
| Cold Rolled Steel 10.51" Normal Force on 1 in² surface, 20"/min. sled speed (ASTM D-1894) | — | 0.073 | — | 0.114 | — | .141 | — | .132 | — |

| | 2D | 2E | 2W Douglas Fir #1 Dense |
|---|---|---|---|

TABLE III-continued

| Ingredient | Vol. % (Molded) | (PHR) | Vol. % (Molded) | (PHR) | Vol. % (Molded) | (PHR) |
|---|---|---|---|---|---|---|
| Hostelen GUR 413 | 79.40 | (100.00) | 78.95 | (100.00) | 0.00 | (0.00) |
| 1/8" PPG 1156 C.S. | 9.44 | (32.50) | 7.94 | (27.50) | 0.00 | (0.00) |
| Exolit 462 | 11.16 | (27.50) | 13.11 | (32.50) | 0.00 | (0.00) |
| Douglas Fir | 0.00 | (0.00) | 0.00 | (0.00) | 100.00 | (100.00) |
| TOTAL | 100.00 | (160.00) | 100.00 | (160.00) | 100.00 | (100.00) |
| Calc. Molded Dens., gm/cc | 1.194 | — | 1.187 | — | .550 | (Actual) |
| Actual Molded Dens., gm/cc | 1.165 | — | 1.148 | — | .550 | — |
| Bulk Factor, Fiberglass | 4.48 | — | 4.48 | — | N/A | — |
| BVPF, Fiberglass | 42.29 | — | 35.57 | — | N/A | — |
| BFG Radiant Panel Flame Test | | | | | | |
| Time to 2.5", Sec. | 408 | — | 470 | — | 51 | — |
| Heat Evolution, % of UHMWPE Control | 63 | — | 56 | — | 75 | — |
| Flame Drip? | No | — | No | — | No | — |
| Izod Impact, Notched | | | | | | |
| Ft. lb/in. Width (ASTM D-256 Method A) | 8.5 | — | 7.5 | — | 4.8 | — |
| Dynamic Coef. of Friction | | | | | | |
| Cold Rolled Steel 10.51" Normal Force on 1 in² Surface, 20"/min. (ASTM D-1894) | .135 | — | .159 | — | .314 | — |

Test results show that all samples in this series (Samples 2A through 2E) which contained both chopped glass fiber and ammonium polyphosphate gave acceptable flame test and impact test results.

EXAMPLE 3

This example shows that not all grades of chopped glass fibers give the same results, and that BVPF, previously defined, which depends on the chopped fiberglass "bulk factor", also previously defined, must be a certain minimum before the desired product uniformity and flame retardant properties are obtained.

Two samples, one (Sample 3A) containing the standard chopped glass fibers (1/8" PPG1156-CS), the other (Sample 3B) containing an equal amount of another grade of chopped glass fibers (3/16" OC 415CA) having a low bulk factor, were prepared and tested according to the procedure of Example 1. The compositions of the samples were identical except that the BVPF of sample 3A was 38.84 and the BVPF of Sample 3B was 25.38. Sample 3A, when observed under magnification, was found to have the glass fibers substantially uniformly distributed throughout the molded matrix. The chopped fibers of Sample 3B, when observed under magnification, had poor distribution throughout the molded matrix. Also Sample 3A had much better flame retardancy, as exhibited by the appreciably longer time (413 seconds vs 286 seconds) to reach the 2.5 inch flame spread mark. It should be noted that the chopped fibers used in 3B, OC 415CA, with a bulk factor of 2.95 (versus 4.48 for PPG1156-CS) could be brought to the same BVPF as 3A (38.84) by increasing the loading of those fibers to 13.17 Vol % (molded)—from the level of 8.67 Vol % (molded) in Sample 3B—improved uniformity and flame retardance of the molding would result. However, it is more desirable from mold flow and cost purposes to keep the volume loadings of additives to a minimum and chopped fiberglass with bulk factors in excess of 3.5 are preferred. We are also establishing a minimum BVPF of 27 for our invention in order to insure the combination of good uniformity and flame retardance.

Results are shown in Table IV below.

TABLE IV

| Ingredient | True Density (gm/cc) | 3 UHMWPE Control Vol. % (Molded) | (PHR) | 3A Standard Fiberglass Vol. % (Molded) | (PHR) | 3B Low Bulk Fiberglass Vol. % (Molded) | (PHR) |
|---|---|---|---|---|---|---|---|
| Hostelen GUR 413 | .940 | 100.00 | (100.00) | 79.02 | (100.00) | 79.02 | (100.00) |
| 1/8" PPG 1156 C.S. | 2.57 | 0.00 | (0.00) | 8.67 | (30.00) | 0.00 | (0.00) |
| 3/16" OC 415CA | 2.57 | 0.00 | (0.00) | 0.00 | (0.00) | 8.67 | (30.00) |
| Exolit 462 | 1.84 | 0.00 | (0.00) | 12.11 | (30.00) | 12.11 | (30.00) |
| Monarch 700 Black | 1.82 | 0.00 | (0.00) | 0.20 | (0.50) | 0.20 | (0.50) |
| TOTAL | | 100.00 | (100.00) | 100.00 | (160.50) | 100.00 | (160.50) |
| True Density Calc., gm/cc | — | .940 | — | 1.192 | — | 1.192 | — |
| Bulk Factor, Fiberglass | — | N/A | — | 4.48 | — | 2.95 | — |
| BVPF, Fiberglass | — | N/A | — | 38.84 | — | 25.58 | — |
| BFG Radiant Panel Flame Test | | | | | | | |
| Time to 2.5", Sec. | — | 97 | — | 413 | — | 286 | — |
| Heat Evolution % of UHMWPE Control | — | 100 | — | 65 | — | 66 | — |
| Flame Drip? | — | Yes 171 sec. | — | No | — | No* | — |
| FG Distribution | — | N/A | — | Very | — | Poor | — |

TABLE IV-continued

| | | 3<br>UHMWPE Control | | 3A<br>Standard<br>Fiberglass | | 3B<br>Low Bulk<br>Fiberglass | |
|---|---|---|---|---|---|---|---|
| Ingredient | True<br>Density<br>(gm/cc) | Vol. %<br>(Molded) | (PHR) | Vol. %<br>(Molded) | (PHR) | Vol. %<br>(Molded) | (PHR) |
| Uniformity | | | | Good | | | |

*Liquid seen in advance of flame front; in prior burn test without carbon black in formulation, actual flaming drip was observed near end of 600 second test at 585 seconds.

EXAMPLE 4

This example shows the effect of placing a non-woven fiberglass "veil" on top of a flame retardant UHMWPE composition prior to compression molding according to this invention.

Samples made and tested in this example: a molded pure UHMWPE control (Sample 4), a molded flame retardant, high impact strength UHMWPE composition according to this invention (Sample 4A) and the same flame retardant, high impact UHMWPE composition with a thin (about 0.010 inch thick) non-woven fiberglass veil placed on top of this composition prior to molding. The fiberglass veil was "Surmat" 100-10% 176 having a thickness of 0.010 inch prior to molding and consisting essentially of about 90 percent by weight of long continuous randomly patterned filaments in a polyester matrix. During compression molding the veil is compressed from a 0.010 inch thickness to 0.005 inch thickness and at the same time the flowable (UHMWPE) and powder ingredients impregnate the compressed veil while the chopped fiberglass is trapped under the veil. The final molding (Sample 4B) is really a laminate of compressed impregnated fiberglass veil (layer 18 in FIGS. 1 and 2)—top 0.005" and the preferred flame retardant high impact composition present from inch below the top surface to its final thickness of 0.500" (larger 12 in. FIGS. 1 and 2) when molded according to the procedure in Example 1. The section just below the veil (from 0.005 to 0.010 inch below the surface) has a higher than normal level of chopped fiberglass due to the "filtering effect" of the veil. In Table V, the composition of the impregnated compressed veil layer 0.005) is included as well as the composition of the bottom 0.490 inch thickness is shown for Sample 4B. The BFG Radiant Panel Flame test was run with the radiant heaters and flame facing the impregnated veil surface, in the case of sample 4B. Sample 4A has the same composition as the composition of samples 1E, 2A and 3A.

The results are shown in Table V below.

TABLE V

| | | 4<br>UHMWPE Control | | 4A<br>Preferred FR<br>Composition | | 4B<br>(4A Composition with .010" Surmat<br>Veil Applied to Top Before Molding) | | | |
|---|---|---|---|---|---|---|---|---|---|
| | | | | | | Top .005" Layer<br>(after Molding) | | Below .010" Layer<br>(after Molding) | |
| Ingredient | True<br>Density<br>(gm/cc) | Vol. %<br>(Molded) | (PHR) | Vol. %<br>(Molded) | (PHR) | Vol. %<br>(Molded) | (PHR) | Vol. %<br>(Molded) | (PHR) |
| Hostelen GUR 413 | 0.940 | 100.00 | (100.00) | 79.02 | (100.00) | 75.05 | (100.00) | 79.02 | (100.00) |
| ¼" PPG 1156 C.S. | 2.57 | 0.00 | (0.00) | 8.67 | (30.00) | 0.00 | (0.00) | 8.67 | (30.00) |
| Surmat 100-10 mil 10% 176 | 2.57 | 0.00 | (0.00) | 0.00 | (0.00) | 13.26 | (48.29) | 0.00 | (0.00) |
| Exolit 462 | 1.84 | 0.00 | (0.00) | 12.11 | (30.00) | 11.50 | (30.00) | 12.11 | (30.00) |
| Monarch 700 Black | 1.82 | 0.00 | (0.00) | 0.20 | (0.50) | 0.19 | (0.50) | 0.20 | (0.50) |
| TOTAL | | 100.00 | (100.00) | 100.00 | (160.50) | 100.00 | (178.79) | 100.00 | (160.50) |
| Calc. Molded Dens., gm/cc | — | 0.940 | — | 1.192 | — | 1.261 | — | 1.192 | — |
| Bulk Factor, Fiberglass | — | N/A | — | 4.48 | — | 15.08[1] | — | 4.48 | — |
| BVPF, Fiberglass | — | N/A | — | 38.84 | — | 200.00 | — | 38.84 | — |
| BFG Radiant Panel Flame Test | | | | | | Flame Test Applied to Top Surface | | | |
| Time to 2.5", Sec. | — | 97 | — | 413 | — | 600[2] | | | |
| Heat Evolution, % of UHMWPE Control | — | 100 | — | 65 | — | 23 | | | |
| Flame Drip? | — | Yes,<br>171 sec. | — | No | — | No | | | |

[1]Although "Bulk Factor" for chopped fiberglass is determined by dividing true density by tapped density, this "Bulk Factor" is determined by dividing the true density by the bulk density of the non-woven veil as determined by its uncompressed measurements.
[2]This Sample did not burn to the 2.5 inch mark during the 600 second (10 minutes) test duration.

Although the preferred molding composition (4A) has very good flame retardance, the impregnated veil surface molded composition (4B) has excellent flame retardance, a significant improvement over 4A. When the 4B molding is used as the top layer(s) of composite 10 (layers 12 and 18), even if the top surface (layer 18) is cut, abraded or damaged, the backup layer of 12 will still provide very good flame retardance.

EXAMPLE 5

This example shows flame tests and physical property results for each layer (separately) of a composite according to this invention as shown in the drawings. Samples 5, (UHMWPE control), 5A (bottom layer component), 5B (top layer component), and 5C (middle layer component) were upscaled in quantity so that 24"×36"×¾" compression moldings could be made. This size was required in order to run both the B. F. Goodrich Radiant Panel Flame Test and the ASTM E162 Flame Test (4 each 6"×18"×¾") as well as several physical property tests from the same molded slab. These slabs were molded according to the criteria set forth for molding the total composites (see pg. 17 of this writing) except the mold heat time was reduced to about 1¼ hours because of the improved heat transfer through the thin moldings (¾" thick vs. 3 to 4" thick). In the case of the Douglas Fir, sample 5W, 6"×18"×¾" boards were machined from 4"×8" timbers for the ASTEM E162 Test. Smoke density, pyrolysis toxicity, notched Izod impact, dynamic coefficient of friction and water absorption were also tested for these composite components and controls where applicable. Results are shown in table VI below.

the inside of hulls of ships under U.S. Pat. No. 4,679,517 are included in Table VI—low water absorption (ASTM D570) in samples 5A, 5B, and 5C (generally less than 0.5%) and low dynamic coefficient of friction of sample 5B—less than 0.2, even when surfaced with a compressed impregnated fiberglass veil.

What is claimed is:

1. A compression molded polymer composition having good flame retardancy and high impact strength, comprising:

TABLE VI

| Ingredients and Composition | 5 UHMWPE Control (Same as UHMWPE Controls 1, 2, 3 & 4) | 5A Bottom Layer of Composite (Same as Samples 1E, 2A, 3A & 4A) | 5B Top Layer of Composite (Same as Sample 4B) | 5C Middle Layer of Composite (Same as Table 1) | 5W Douglas Fir Comparison Sample (Same as Douglas Fir Samples 1W, 2W) |
|---|---|---|---|---|---|
| Calc. Molded Dens., (gm/cc) | 0.940 | 1.192 | 1.192 | 1.574 | N/A |
| Actual Molded Density (gm/cc) | 0.931 | 1.190 | 1.187 | 1.577 | .530 |
| BFG Radiant Panel Flame Test | | | | | |
| Time to 2.5", Sec. | 110 | 463 | 600 | 570 | 64 |
| Heat Evolution, % of UHMWPE Control | 100 | 52 | 16 | 17 | 70 |
| Flame Drip? | Yes (185 Sec.) | No | No | No | No |
| ASTM E-162 (Avg. of 4 Samples, U.S. Testing, Fairfield, N.J.) | | | | | |
| Flame Spread Factor, Fs | 6.78 | 1.59 | 1.40 | 1.38 | 5.09 |
| Heat Evolution Factor, Q | 12.55 | 8.70 | 5.53 | 8.02 | 6.77 |
| Flame Spread Index Is = Fs × Q | 85.05 | 13.82 | 7.74 | 11.06 | 34.47 |
| Total Test Time, Sec. | 285 | 900 | 900 | 900 | 557 |
| Flame Drip? | Yes | No | No | No | No |
| NBS Smoke Chamber - Flaming Mode | | | | | |
| DM (30 Min.) | NR | 331 | 216 | 372 | NR |
| D at 90 Sec. | NR | 0.4 | 0.5 | 2.9 | NR |
| D at 4 Min. | NR | 4.1 | 3.5 | 85.9 | NR |
| Pyrolysis Toxicity | | | | | |
| HCN, Haolgens | NR | ND | ND | ND | ND |
| Notched Izod Impact | | | | | |
| Ft-Lb./In. Width (ASTM D-256 Method A) | 19.3 | 9.4 | 9.4 | N/A | 4.7 |
| Dynamic Coef. of Friction | | | | | |
| Cold Rolled Steel (ASTM D-1894) | .103 | .134 | .150–.195* | N/A | .315 |
| H₂O Absorption (ASTM D-570) 24 Hrs. at 23° C. | | | | | |
| Wt. % Gain | — | .29 | .30 | .03 | 30.14 |
| Vol. % Gain | .15 | .35 | .36 | .04 | 15.77 |

NR = Not Run
ND = Not Detected
*The coefficient of friction varies to some degree on the amount of "strike-through" of the powder/UHMWPE melt through the fiberglass veil.

The results show that there is a reasonably good correlation between the larger scale ASTM E162 test and the smaller scale BFG Radiant Panel Flame Test which was used for initial screening and that all three layers of the composite have good to excellent flame retardance, low to moderate smoke, and do not generate either halogens or cyanides during pyrolysis. The top layer of the composite, 5B, which is really a combination of layers 18 and 12 in FIGS. 1 and 2, shows significantly improved flame retardance over the bottom layer, 5A, depicted as layer 16 in FIGS. 1 and 2, containing the same composition without the compressed impregnated veil, in both flame tests including ASTM E162. The flame retarded EPDM elastomer layer, 5C, shown as layer 14 in FIGS. 1 and 2, has excellent flame retardance, low to moderate smoke and low toxicity of pyrolysis products. In addition the large scale moldings of high impact samples 5A and 5B produced similar impact strengths to the smaller scale moldings previously shown in examples 1-3. Other properties considered important for the protection of a) a polymer which is a high impact strength ultra-high molecular weight polyethylene (UHMWPE) which is free of halogen and cyanide or derivatives thereof on combustion;

b) at least 4.40 percent by volume as molded ammonium polyphosphate (APP); and c) at least 6 percent by volume as molded of chopped glass fibers;

wherein the maximum amount of component (b) in combination with component (c) as molded is an amount such that composition has a notched Izod impact strength of at least about 7 ft.lbs. per inch of width, wherein the bulk volume percent fiberglass (BVPF) prior to molding is at least about 27 percent of the volume of the polymer composition as molded, and wherein said polymer composition exhibits no flame drip according to ASTM E-162.

2. The polymer composition according to claim 1, wherein the volumetric ratio of (b) to (c) is between about 0.465 and 1.65 as molded, and wherein the weight average molecular weight of said UHMWPE is at least 2½ million.

3. The polymer composition according to claim 2, wherein said APP is present in an amount of about 12.13 volume percent; wherein said chopped fiberglass is present in an amount of about 8.69 volume percent; and wherein said UHMWPE is present in an amount of about 79.18 volume percent.

4. The polymer composition according to claim 1, wherein said composition has a flame spread index, according to ASTM E-162, achieves a class A rating, corresponding to less than 25 percent compared to that of pure ultra-high molecular weight polyethylene (UHMWPE) and wherein the weight average molecular weight of said UHMWPE is at least about 2½ million.

5. The polymer composition according to claim 4, wherein said ammonium polyphosphate is essentially water insoluble.

6. A shaped article for protecting an object from impact damage comprising the polymer composition of claim 1, and wherein the weight average molecular weight of said UHMWPE is between about 3 million to about 7 million.

7. The shaped article according to claim 6, said shaped article being a panel of essentially rectangular shape in which the length and width are substantially greater than the thickness.

8. A molded composition comprising:
a compression molded article having a notched Izod impact strength of at least about 7 ft.-lbs. per inch of width, said compression molded article made from a blend of
a) a polymer powder which is UHMWPE powder;
b) ammonium polyphosphate in powder form; and
c) chopped glass fibers;
wherein the bulk volume percent fiberglass (BVPF) prior to molding is at least 27 percent of the volume of the polymer composition as molded, and wherein said molded composition exhibits no flame drip according to ASTM E-162.

9. The molded composition of claim 8, wherein the particle size of said UHMWPE powder is less than about 215 microns, and wherein the weight average molecular weight of said UHMWPE is at least about 2½ million.

10. The molded composition of claim 9, wherein the particle size of the flame retardant additive (b) is less than about 50 microns.

11. The molded composition of claim 10, wherein the length of the chopped glass fibers (c) is less than about ¼ inch.

12. The molded composition according to claim 8, including a thin fiber cloth or veil located on the top of said blend prior to molding.

13. The molded composition of claim 12, wherein said cloth or veil thickness is less than about 2 percent of the total thickness of said final molded composition.

14. A composite laminate for protecting a surface from impact damage, said composite laminate comprising;

a first layer comprising;
a) a polymer which is a high impact strength ultra-high molecular weight polyethylene (UHMWPE) which is free of halogen and cyanide or derivatives thereof on combustion;
b) at least 4.40 percent by volume as molded of ammonium polyphosphate; and
c) at least 6 percent by volume as molded of chopped glass fibers;
wherein the maximum amount of component (b) in combination with component (c) as molded in an amount such that composition has a notched Izod impact strength of at least about 7 ft.lbs. per inch of width, wherein the bulk volume percent fiberglass (BVPF) prior to molding is at least about 27 percent of the volume of the polymer composition as molded, and wherein said polymer composition exhibits no flame drip according to ASTM E-162;
an elastomeric second layer bonded to said first layer; and an optional fiber veil attached to said remaining side of said first layer.

15. The composite laminate of claim 14, wherein said composite laminate further comprises a third layer comprising:
a) a high impact strength ultra-high molecular weight polyethylene (UHMWPE) polymer which is free of halogen and cyanide or derivatives thereof on combustion;
b) at least 4.40 percent by volume as molded of ammonium polyphosphate; and
c) at least 6 percent by volume as molded of chopped glass fibers;
wherein the maximum amount of component (b) in combination with component (c) as molded is an amount such that composition has a notched Izod impact strength of at least about 7 ft.lbs. per inch of width, and wherein the bulk volume percent fiberglass (BVPF) prior to molding is at least 27 percent of the volume of the polymer composition as molded,
said first layer and said third layer being bonded to opposite surfaces of said second layer.

16. The composite laminate of claim 14, wherein said elastomeric layer contains a flame retardant which does not generate halogen or cyanide upon pyrolysis.

17. The composite laminate of claim 14, wherein said flame retardant in the elastomer layer is alumina trihydrate.

18. The composite laminate of claim 14, wherein said elastomer is crosslinked.

19. A compression molded polymer composition having good flame retardancy and high impact strength, consisting essentially of:
a) a high impact strength ultra-high molecular weight polyethylene;
b) at least 4.40 percent by volume as molded of ammonium polyphosphate; and
c) at least 6 percent by volume as molded of chopped glass fibers, wherein the bulk volume percent fiberglass prior to molding is at least 27 percent of the volume of the polymer composition as molded.

* * * * *